United States Patent
Hamilton

(10) Patent No.: US 11,420,403 B2
(45) Date of Patent: Aug. 23, 2022

(54) CONTACT LENS MANUFACTURING METHOD

(71) Applicant: DAYSOFT LIMITED, Blantyre (GB)

(72) Inventor: Ronald Hamilton, Glasgow (GB)

(73) Assignee: DAYSOFT LIMITED, Blantyre (GB)

( * ) Notice: Subject to any disclaimer, the term of this patent is extended or adjusted under 35 U.S.C. 154(b) by 235 days.

(21) Appl. No.: 16/223,236

(22) Filed: Dec. 18, 2018

(65) Prior Publication Data

US 2019/0111640 A1 Apr. 18, 2019

Related U.S. Application Data

(62) Division of application No. 13/989,105, filed as application No. PCT/EP2011/070992 on Nov. 24, 2011, now Pat. No. 10,166,730.

(30) Foreign Application Priority Data

Nov. 26, 2010 (GB) ...................................... 1020106
Aug. 15, 2011 (GB) ...................................... 1114009

(51) Int. Cl.
*B29D 11/00* (2006.01)

(52) U.S. Cl.
CPC .. *B29D 11/00038* (2013.01); *B29D 11/00192* (2013.01); *B29D 11/00567* (2013.01)

(58) Field of Classification Search
CPC ........ B29D 11/00038; B29D 11/00192; B29D 11/00567; B29D 11/0048; B29D 11/0049; B29D 11/005; B29D 11/00519
See application file for complete search history.

(56) References Cited

U.S. PATENT DOCUMENTS

| 4,640,489 A | 2/1987 | Larsen |
| 5,143,660 A | 9/1992 | Hamilton et al. |
| 5,271,875 A | 12/1993 | Appleton et al. |
| 2006/0006558 A1* | 1/2006 | Yamada ........... B29D 11/00125 264/2.2 |

(Continued)

FOREIGN PATENT DOCUMENTS

| EP | 0 383 425 A2 | 8/1990 |
| EP | 1 407 866 A1 | 4/2004 |
| EP | 1 852 246 A2 | 11/2007 |

(Continued)

OTHER PUBLICATIONS

International Search Report, Application No. PCT/EP2011/070992, dated Feb. 10, 2012.

*Primary Examiner* — Ryan M Ochylski
(74) *Attorney, Agent, or Firm* — The Marbury Law Group, PLLC

(57) ABSTRACT

In manufacturing a contact lens, a contact lens mould arrangement in which the engagement between the mould halves is unconstrained and at least one mould half is sufficiently pliable or flexible that during the curing of the contact lens composition at one mold half may move or flex relative to the other to define a post-cure mould cavity of smaller volume than the precure mould cavity and during which the curvatures of the first and/or second mould surfaces are allowed to change provides a significantly more efficient manufacturing process and enables one mould half to be readily utilized as a blister cup for contact lens packaging.

10 Claims, 9 Drawing Sheets

(56) References Cited

U.S. PATENT DOCUMENTS

2009/0166904 A1     7/2009   Lawton et al.

FOREIGN PATENT DOCUMENTS

| | | |
|---|---|---|
| GB | 2 006 091 A | 5/1979 |
| GB | 1 575 694 A | 9/1980 |
| GB | 2 219 413 A | 12/1989 |
| WO | 87/04390 A1 | 7/1987 |
| WO | 2004/076160 A1 | 9/2004 |

* cited by examiner

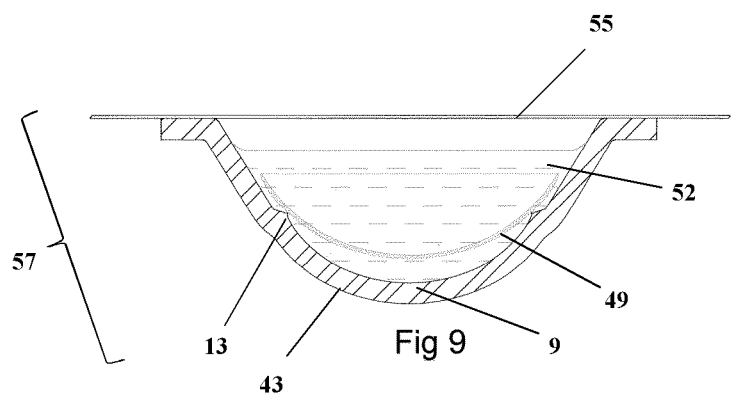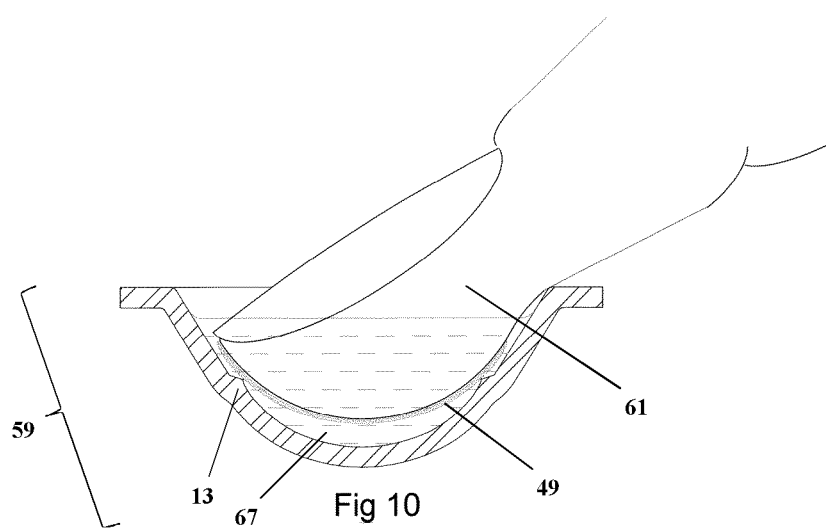

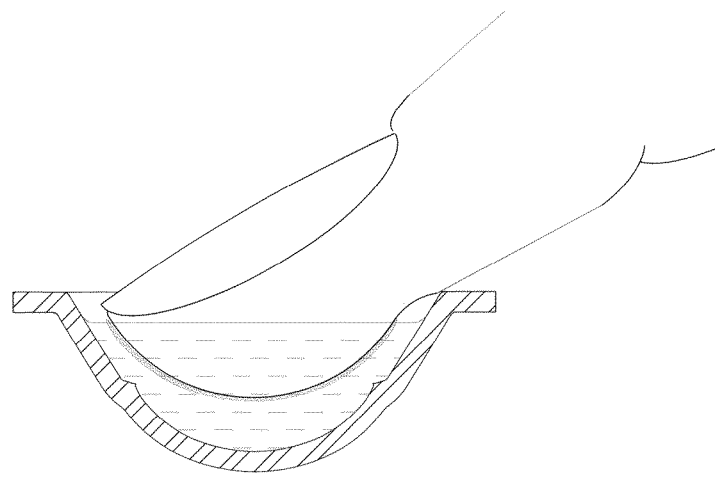
Fig 11
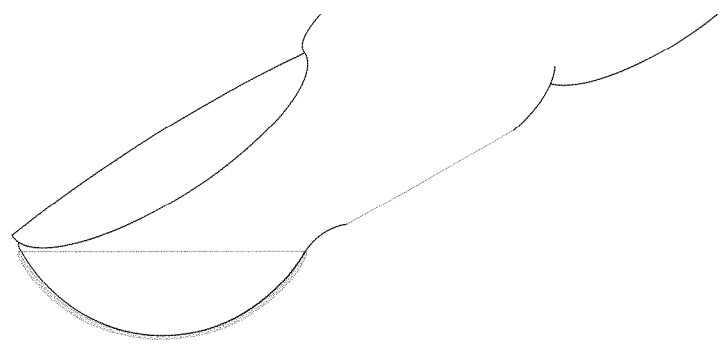
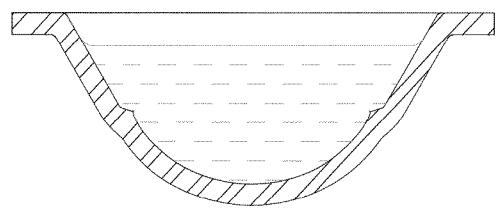
Fig 12

CONTACT LENS MANUFACTURING METHOD

This application is a divisional of U.S. application Ser. No. 13/989,105, filed on Oct. 7, 2013, issued as U.S. Pat. No. 10,166,730 on Jan. 1, 2019, which is a national stage application of PCT/EP2011/070992, filed internationally on Nov. 24, 2011, which claims priority to GB Application No. 1020106.9, filed on Nov. 26, 2010, and GB Application No. 1114009.2, filed on Aug. 15, 2011.

FIELD OF THE INVENTION

This invention pertains generally to the field of contact lenses, contact lens manufacturing and contact lens packaging. It further relates to an apparatus, system and method for the manufacture of contact lenses, to a contact lens and to packaged contact lens and to a method of packaging a contact lens.

BACKGROUND OF THE INVENTION

Three basic manufacturing techniques are used in the manufacture of soft contact lenses. These are generally referred to as lathing (cutting both lens surfaces and edge on a pre-polymerised 'button'), spin casting (using a single concave mould piece to form the front surface of the lens) and cast moulding (using a concave mould piece to form the front surface of the lens and a second convex mould pieces to form the back surface of the lens).

Lathing is a suitable process where there is a low batch size and a wide variety of lens powers and/or shapes required e.g. for toric lens manufacture. Spin casting is a suitable process for higher batch sizes, however, the 'open' surface not being in contact with a mould will be parabolic this being a 'compromise' profile to the generally spherical profile of the cornea. Cast moulding is a suitably process for very high volume manufacture and facilitates the precise profiling of both the front (by the concave mould surface) of the lens and back surface (by the convex mould surface) of the lens e.g. creating a bi-curve or even a tri-curve profile for optimum cornea fit.

There are also three basic contact lens packaging systems: a glass vial with bung and metal clip closure; a plastic 'mould-cup' with metallised foil seal; and an integrated plastic 'mould-cup' where one of the mould pieces used to form a cast lens is also used as the packing container generally sealed with metallised foil.

The health-care benefits of frequent lens replacement, e.g. monthly, bi-weekly or daily replacement, necessitate the lowest cost of lens manufacture and packaging. For example, the cost of vial packaging renders this system inappropriate on cost grounds for any frequent replacement modality of lens wear. Daily-disposable contact lenses are increasingly recognised as providing the healthiest modality of contact lens wear but the wearer's requirement of up to 730 contact lenses per year requires extremely low unit cost whilst ensuring high quality lens manufacture and high levels of on-eye comfort and visual acuity.

The optimum combination for meeting these stringent requirements would be the use of a cast-moulding process incorporating the use of one of the mould-pieces (either the concave or convex moulding) to form the lens-cup package.

In cast-moulding of soft contact lenses, which typically comprises curing a curable solution (of, typically, polymerisable monomers) in a lens-forming cavity formed between two mould halves, the common challenges include controlling the power of the contact lens being produced and edge formation. If the edge-formation is inconsistent, it may require cutting. If the edge formed is too discrete, it may cause discomfort for the user. A further problem in the cast-moulding of contact lenses is how to deal with monomer 'shrinkage', the inevitable reduction in volume in the curing stage. The monomer materials undergo volumetric shrinkage of at least 10% and typically between 10 and 20%. Failure to properly compensate for this shrinkage will result in unacceptably high wastage rates and/or poor quality products containing voids or bubbles.

There are several approaches that have been developed in the cast-moulding of contact lenses designed to enhance contact lens manufacture and in some cases to overcome one or more of the above problems.

GB-A-2006091 describes a method of manufacturing contact lenses by curing (or gelling) a contact lens-forming solution in a lens shaped space formed between a concave mould and a convex mould. This method is characterised by the mould cavity being an open mould and by over-filling the mould cavity with solution so as to form a reservoir of solution which can seep back into the mould cavity to allow for volumetric shrinkage during the curing (or gelling) process. A particular problem with this method, however, is that fluid within the channel (at the edges of the mould cavity), where fluid from the reservoir is intended to flow into the mould cavity during curing, tends to cure more rapidly (due to the confined volume) as compared with the main body of the lens cavity. A further problem is that post-curing, it is necessary to cut the cured 'reservoir' ring from the mould, or where it is selectively cured to cut or polish imperfectly formed edges. Rigid, inflexible materials, such as glass, are preferred for use as the mould halves.

WO-A-87/04390 describes a polyolefin mould for casting contact lenses. A mould cavity in which a monomer composition is placed for formation of a contact lens is formed between plastic male and female mould halves which cooperate by sliding fit and reach a final engagement position when a rigid (non-flexible) shoulder on one mould half (typically the female) engages with the other mould half to form a seal. The point of engagement of the rigid shoulder with the other mould half (preferably a rigid engagement) defines the radial diameter of the lens to be formed. At least one mould half, typically the male mould half, is formed with a diaphragm portion in which the material is sufficiently thin and flexible as to move toward the other mould half under the forces generated by the monomer shrinkage during curing. Such diaphragm behaviour of at least one mould half thereby compensates for the volumetric shrinkage during curing. The diaphragm behaviour is intended to avoid bubbles and voids in the resultant contact lenses. The rigid shoulder is preferably formed on the female mould half and preferably with a slight return, to ensure that the moulded lens remains in the female mould half when the mould halves are separated. WO-A-87/04390 further discloses that the female mould half retaining the cured lens may be used as a package for the hydrated lens by hydrating the lens and sealing a lid to the flange of the female mould half. A particular disadvantage of this system is that the diaphragm portion which flexes during curing is difficult to form in a manner which gives consistent curvature in the lenses (or to ensure that cavitation and bubbles in the lens are avoided). Further, in providing a return on a non-flexible shoulder, removal of the lens from the female mould half is difficult, even if hydrated in situ. The proposed mould arrangement is bulky (in order to ensure that a slide fit engagement can be achieved and to provide internal volume for later processing), which leads to significant material loss (in the male half that is disposed of) and resultant bulky packaging of contact lens.

U.S. Pat. No. 5,143,660 is an alternative arrangement for providing a mould half as a contact lens package and which arrangement also utilises diaphragm behaviour of the mould surfaces to compensate for monomer shrinkage during curing. In U.S. Pat. No. 5,143,660, the two mould halves cooperate to seal against a rigid shoulder by a sliding fit which seal defines a radial diameter of the lens. The curing stage is carried out at superatmospheric pressure to ensure that even deflection of the diaphragm surface (typically of each mould half) occurs in order to produce lenses of consistent and even curvature. The male mould half surface is formed with greater surface energy so as to allow the lens to remain on the male mould half after separation of the mould halves. The male mould half is provided with an annular wall (which is involved in the sliding fit) whereby a lid may be applied to the rim of the annular wall to form a package in which the lens is provided on the convex internal surface of the package, thereby presenting the lens in a manner that it can be removed by the user without touching the eye-contacting surface of the lens. Disadvantages of this system include the precision of manufacture necessary to ensure sealed sliding fit and diaphragm behaviour, the increased complexity of requiring superatmospheric pressure, the excess material required to provide the slide-fit engagement (and non-optical) portions of the mould half and the fact that the convention in contact lens use is for the user to be presented with a lens concave surface up.

EP-A-0383425 describes a contact lens mould arrangement having male and female mould halves in sliding fit cooperation in which the male mould half is provided with a shoulder that engages a cylindrical or frusto-conical portion of the female mould half adjacent the anterior lens surface-forming mould surface. During polymerisation, the male mould half may move toward the female mould half from its pre-engagement position defined by engagement of mating surfaces (flanges) formed on the distal edges of the cylindrical walls as a result of a hinging effect of the male mould half at the shoulder junction. Thereby the volumetric shrinkage may be compensated by the male mould half moving slightly toward the female mould half as a result of this lever effect.

Several documents describe another form of mould arrangement in which the curvature of the lens forming surfaces of the mould halves remains constant but the cavity volume (and radial diameter) changes during the curing by providing an annular flexible lip on the male or female mould half at the extremity of lens-forming cavity, which flexing of the lip allows the two mould halves to move closer together to compensate for monomer shrinkage. One example is GB-A-1575694 in which a piston-cylinder slide fit arrangement of rigid mould halves is provided to define a mould cavity, the edge region defined by the engagement of a flexible rim formed on the male or female mould half with the other mould half. During curing, the lip flexes (typically inward) allowing the mould halves to move closer to compensate for monomer shrinkage. WO-A-2004/076160 provides a similar slide-fit arrangement whereby a flexible annular lip is provided on a female mould half which engages with an annular abutment section of a male mould half thereby defining the edge of the contact lens. During curing, the lip may flex radially outwards along the abutment surface thereby increasing the radial dimension of the lens forming cavity whilst the two mould halves are drawn together. A particular disadvantage of the flexible lip arrangement is that the flexible lip can affect the seal resulting in reject lenses and the edge portions of resulting lenses tend to be inconsistent and in need cutting or polishing. Further, to ensure misalignment does not occur, the cylinder-piston arrangement of mould halves must be manufactured with a good deal of precision to ensure close and replicable fit.

The prior art thus suffers from disadvantages mentioned, which typically include one or more of inconsistency of lens edge-forming, reliability and consistency of lens curvature, complexity of manufacturing, requirements for precision in non-optical portions of mould-halves, degree of material waste and unsuitability for use of the lens-forming mould half in packaging.

The present inventors have found that a fundamentally new approach to cast moulding of contact lenses allows them to overcome many of the above problems, to utilise more efficient manufacturing processes and to effectively and efficiently utilise a mould half as a blister in contact lens packaging.

Problem to be Solved by the Invention

There remains a need for improvements in contact lens manufacture which address one or more of the aforementioned problems.

It is an object of this invention to provide a method of manufacturing contact lenses that provides increased efficiency in manufacturing combined with optimization of lens design.

It is a further object of this invention to provide a method of manufacturing a contact lens that enables a mould half to be utilized in contact lens packaging.

It is a still further object of the invention to provide a mould half that is useful for efficient contact lens manufacture and for use as a compact and user friendly contact lens pack.

It is still further an object of the invention to provide a method of manufacturing and producing a contact lens having the required optical properties at low unit cost.

SUMMARY OF THE INVENTION

In accordance with a first aspect of the invention, there is provided a method for the manufacture of a contact lens, the method comprising providing a first, concave, mould-half having a first concave mould surface to correspond with a convex surface of the contact lens; providing a second, convex, mould-half having a second convex mould surface to correspond with a concave surface of the contact lens, said second mould half configured to engage with the first mould-half to define a first, pre-cure, mould cavity therebetween, which mould cavity is defined by the first, concave, mould surface and second, convex, mould surface said first and second mould surfaces having respective curvatures to correspond with a pre-determined lens power/curvature and wherein the first or second mould surface is defined by an annular ridge formed on the respective mould half; disposing into the mould cavity a curable lens-forming fluid composition; curing said composition to form a pre-hydrated lens; and separating the first and second mould halves, characterized in that the engagement between the mould halves is unconstrained and at least one mould half is sufficiently pliable such that during the curing of said composition the first and/or second mould halves move relative to one another and/or flex such as to define between the first and second mould surfaces a second, post-cure, mould cavity, which second post-cure mould cavity defines a smaller volume than said first pre-cure mould cavity.

In a second aspect of the invention, there is provided a method for the manufacture of a contact lens, the method comprising providing a first, concave, mould-half having a first concave mould surface to correspond with a convex surface of the contact lens; providing a second, convex, mould-half having a second convex mould surface to correspond with a concave surface of the contact lens, said second mould half configured to engage with the first mould-half to define a first, pre-cure, mould cavity therebetween, which mould cavity is defined by the first, concave, mould surface and second, convex, mould surface said first and second mould surfaces having respective curvatures to correspond with a pre-determined lens power/curvature and wherein the first or second mould surface is defined by an annular ridge formed on the respective mould half; disposing into the mould cavity a curable lens-forming fluid composition; curing said composition to form a pre-hydrated lens; and separating the first and second mould halves, characterized in that at least the first mould half is formed of a material sufficiently pliable under curing conditions that during curing, the radial dimension defined by the diameter of the annular ridge changes to accommodate the volumetric reduction of lens-forming composition due to curing.

In a third aspect of the invention, there is provided a female mould half that has an annular ridge and that is sufficiently pliable that under curing conditions (to cure a contact lens-forming curable fluid composition) and in contiguous contact via the annular ridge with a male mould half, the female mould half may flex, optionally in concert with the male mould half, to accommodate any shrinkage of the composition.

In a fourth aspect of the invention, there is provided the use of a female mould half as defined above as a blister cup.

In a fifth aspect of the invention, there is provided a packaged contact lens comprising a blister cup containing a hydrated contact lens of pre-determined hydrated curvature, a saline solution, and a foil cover sealed to a rim of the blister cup, the blister cup comprising an annular ridge (or protrusion) on its interior surface and a curved optical portion radially inwards from said annular ridge said curved portion having a curvature less than that of the hydrated contact lens, characterized in that on the application of pressure upon the annular ridge, the material of the curved portion is caused to flex whereby the curvature (radius) of said curved portion is caused to increase and/or the diameter of the annular protrusion is caused to increase.

In a sixth aspect of the invention, there is provided a packaged contact lens comprising a blister cup containing a hydrated contact lens of pre-determined hydrated curvature, a saline solution, and a foil cover sealed to a rim of the blister cup, the blister cup comprising an annular ridge (or protrusion) on its interior surface and a curved optical portion radially inwards from said annular protrusion said curved portion having a curvature less than that of the hydrated contact lens, characterized in that the blister cup comprises a tapered outer portion (or peripheral portion) radially outward from the annular ridge, which tapered outer portions (or peripheral portions) are configured to allow the hydrated contact lens to rest unencumbered in contact with the annular ridge.

In a seventh aspect of the invention, there is provided a contact lens obtainable by the methods defined above.

In an eighth aspect of the invention, there is provided a mould-half master for one or each of a female and a male mould half for use in a method defined above, from which a respective female or male mould half may be cast, and a method of manufacturing a plastic female and/or male contact lens mould half.

In a ninth aspect of the invention, there is provided a method for the design of a contact lens manufacturing process, the method comprising providing a mould design comprising a first mould half and a second mould half and therebetween defined a lens-forming mould cavity, the first mould half having an optical surface to correspond with a convex surface of a contact lens, the second mould half having an optical surface to correspond with a concave surface of a contact lens, the first and second mould halves in unconstrained engagement;

selecting a first material for use in manufacture of a first mould half;

selecting a second material for use in manufacturing a second mould half;

casting a plurality of first and second mould halves each first and second mould half pair defining a specific pre-cure mould cavity having certain dimensional characteristics;

selecting a lens-forming composition for use in manufacturing a contact lens;

manufacturing a plurality of contact lenses utilizing the plurality of first and second mould halves according to the mould design, said manufacture being according to certain cure and post-cure treatment conditions;

recording certain lens characteristics; and devising therefrom an empirical relationship between mould half dimensions and desired lens characteristics for use in sizing of mould halves in a contact lens manufacturing process.

In a tenth aspect, there is provided a process for manufacturing a contact lens having predetermined lens characteristics, the process comprising selecting a lens-forming composition for use in manufacturing the contact lens, providing first and second mould halves of dimensions determined according to an empirical relationship determined for that lens-forming composition by the above method, arranging said mould halves in a mould half arrangement defining a pre-cure (lens-forming) mould cavity, disposing the lens-forming composition in the pre-cure mould cavity, curing said composition to form a pre-hydrated lens, separating the first and second mould halves and hydrating the pre-hydrated lens to produce a contact lens of pre-determined lens characteristics.

Advantages of the Invention

The method and articles of the present invention enable a significantly more efficient manufacturing process for contact lenses and in particular packaged daily disposable contact lenses. The methods and articles of the invention enable a contact lens mould half to be utilized as a blister cup in contact lens packaging whilst enhancing the efficiency in terms of procedure and material use in packaged contact lens manufacture. The method and articles of the invention further enable the use of a contact lens mould half as a packaged contact lens blister cup which packaged contact lens blister cup remains compact, efficient to manufacture and distribute and reduces handling of the manufactured contact lens.

The method of designing and manufacturing contact lenses according to further aspects of the present invention, taking advantage of the unconstrained manner in which the mould halves engage (e.g. ball and socket arrangement) is significantly more efficient and negates the need for precision manufacture of peripheral portions of the mould halves (as compared with prior art piston-cylinder arrangements) and allows relatively straightforward accommodation in changes in the manufacture process (e.g. different materials or conditions).

BRIEF DESCRIPTION OF THE DRAWINGS

FIGS. 1 to 12 illustrate in cross-section the arrangement of female and male mould halves according to a preferred embodiment of the present invention at various stages of the method of manufacture and use of a packaged contact lens;

DETAILED DESCRIPTION OF THE INVENTION

Figure 1:
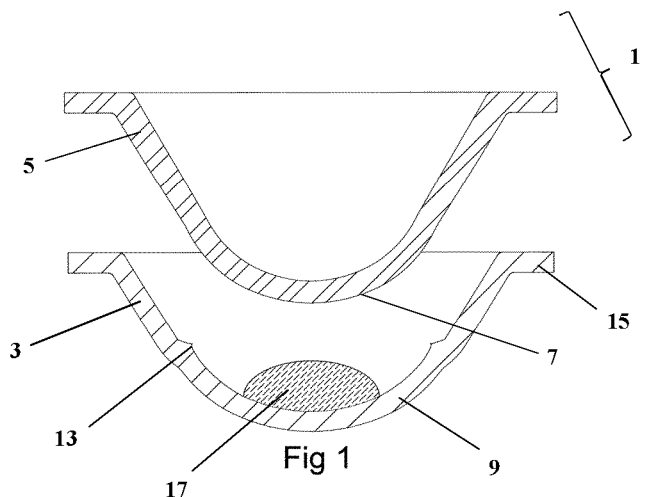

The invention provides for an improved contact lens manufacturing process, a contact lens manufacturing process that is more efficient and allows a mould half to be utilized in a contact lens blister pack, and provides for an improved contact lens blister in which the lens is readily retrievable by the user. It further allows for a compact packaging of contact lenses suitable for efficient distribution, which minimizes the use of materials in its manufacture. Further, it allows significant freedom in design of mould half/blister cup shape and variation in materials type without the need to significantly change the manufacturing process.

A contact lens manufacturing method of the present invention comprises providing two mould halves, a first (concave) mould half which has a concave mould surface which corresponds with the convex surface of the contact lens to be formed and a second (convex) mould half which has a convex mould surface which corresponds with the concave surface of the contact lens to be formed. By 'concave mould surface which corresponds with the convex surface of the contact lens' it is meant not that the curvature (radius) of the concave mould surface is identical to the curvature of the convex surface of the hydrated contact lens, or even the pre-hydrated contact lens, but that the concave mould surface is responsible for the shaping of the convex surface of the resulting lens, which has a size and curvature that derives from that of the concave mould surface as a result of the process (which meaning similarly applies to 'convex mould surface'). The mould surfaces of the first and second mould halves may each be said to have an optic zone and a peripheral zone. An optic zone of a mould surface or of a mould half as used herein is that part of the mould surface or mould half which corresponds with (i.e. which ultimately shapes) the optic zone of a lens to be manufactured in the mould half. By optic zone of a lens, it is meant that portion of a lens which contributes corrective power to the lens. A peripheral zone of a mould surface or mould half is that part of the mould surface half that corresponds with (i.e. which ultimately shapes) the peripheral zone of a lens to be manufactured in the mould half. By peripheral zone of a lens, it is meant that portion of a lens which is not the optic zone and which is peripheral to the optic zone and does not substantially contribute corrective power to the lens.

The first mould half may otherwise be referred to as a female mould half and the second mould half may otherwise be referred to as a male mould half. For the method of the invention, the first and second mould halves may be provided in lens-forming engagement, typically by placing the second mould half on the first mould half (or vice versa) whereby the mould halves define therebetween a pre-cure mould cavity defined in particular by the first, concave, mould surface and the second, convex, mould surface, wherein a perimeter of the first or second mould surface is defined by an annular ridge formed on the respective mould half.

Prior to bringing the mould halves into lens forming engagement, a lens-forming composition, e.g. a lens forming fluid composition, which is curable to form a lens, may be disposed onto a surface of the first or second mould half so as to effectively dispose the lens-forming composition into the pre-cure (lens forming) mould cavity. Typically, the lens-forming composition is charged or disposed into the first mould half (the female mould half), but depending upon the configuration of apparatus for manufacture and the nature (in particular viscosity) of the composition may be disposed onto the female or male mould half.

The composition in the pre-cure mould half may then be cured (e.g. by exposing the mould arrangement to curing conditions, such as heat or ultraviolet radiation) to form a pre-hydrated lens. The mould halves may then be separated.

The method of the invention is characterized by provision of mould halves that may flex or adapt relative to one and/or other during curing to accommodate the monomer shrinkage caused during curing (i.e. the volume reduction associated with curing the lens-forming composition to form the pre-hydrated lens). The mould halves are particularly characterized in that at least one and preferably both of the mould halves are unconstrained, by which it is preferably meant that there is no dimensional change that is prevented by the nature of the engagement of the mould halves. More preferably, relative movement of the first and second mould halves is not prevented. In particular, it is preferred that engagement between the mould halves is unconstrained, by which it is meant that at least relative radial movement and preferably also relative axial movement of the first and second mould halves is not prevented by the manner of engagement of the mould halves. Preferably, such relative radial and axial movement of the optical portions of the mould halves, more preferably optic zones of the mould halves, is not prevented by the engagement of the mould halves. Optionally, relative rotational movement (tilting) is at least in part not constrained by the engagement of the mould halves. By not constraining the relative axial movement of the mould halves, e.g. by not having a rigid shoulder on for example the female mould half and a corresponding engagement on the male mould half, the mould halves may move together to an extent required. Such movement requires a degree of flexibility in one or other mould half and this flexibility is preferably not provided by a flexible lip (as is known in the prior art) but instead by pliability or flexibility in the material of the one or both mould halves including a non-rigid ridge.

The first and/or second mould halves are further characterized by having sufficient flexibility or pliability such that during curing of a lens-forming composition, the first and/or second mould halves move and/or flex such as to define between the first and second mould surfaces a second, post-cure, mould cavity which defines a smaller volume than the first pre-cure mould cavity.

Preferably, the flexibility is provided in the optical portion of the first and/or second mould half (i.e. the optical surface), more preferably including the optic zone of the first and/or second mould half. The flexibility is preferably provided to the first (female) mould half and optionally and preferably also the male mold half. More preferably the flexibility is not discontinuous across the optical portion of the or each mould half, which preferably includes the optic zone. By 'not discontinuous flexibility' it is meant that there are no clear discontinuities in the degree of flexibility across at least the optical portion of the mould half. That is not to say that flexibility is constant across the mould half, since it may vary, for example at the centre as compared with the edges. However, there should be no focus of flexibility or region in which flexibility is restricted. Optionally, the flexibility across the optical portion (i.e. mould surface) of the or each mould half is substantially uniform.

Thus, it is a preferred embodiment that the curvature of the mould surface of one, other or both mould halves is, before curing, different to the curvature of the corresponding surface of the pre-hydrated lens formed and that thus, the said mould surface curvature changes (i.e. is allowed to change) during the curing step. This characteristic is preferably enabled by the not discontinuous flexibility of the optical portion of the mould half and/or the unconstrained engagement of the mould halves, as discussed above. Such an open and flexible arrangement enables the mould halves during curing to reach a stable configuration without forcing constraints on the movements and shapes of the mould halves and mould arrangement which can otherwise lead to errors in manufacture, the requirement for precision manufacture and points of weakness.

Preferably at least a female mould half is unconstrained in engagement with the male mould half and is sufficiently pliable or flexible across the optical portion, which flexibility is not discontinuous, that the curvature of the mould surface thereon may change to accommodate a volumetric reduction of material during curing. More preferably both the male and female mould halves are unconstrained (e.g. they are in unconstrained engagement) and optionally both exhibit the said flexibility or pliability.

In one embodiment, the mould halves or mould arrangement is such that the mould halves move, flex or adapt to define therebetween a second, post-cure, mould cavity, which second post-cure mould cavity defines a smaller diameter than the first pre-cure mould cavity. In particular, according to this embodiment, the diameter of the annular ridge is reduced during the curing step. Without being bound by theory, it is believed that the reduction in diameter of the non-rigid annular ridge may occur due to slight softening and increasing pliability of the mould material under curing conditions, whereby the volumetric shrinkage of the lens-forming composition during curing causes adjustment in whatever dimension there is an inclination for, due to the relative properties and shapes of the mould halves and materials used. In this embodiment, this is reduction in annular ridge diameter. It is believed it is the unconstrained nature of the mould arrangement allowed by the mould designs according to the present invention that enables the change of least resistance to occur in accommodating the volumetric reduction, which change may either be radial contraction of the annular ridge, or radial expansion of the annular ridge (which allows the second, male, mould half to be drawn into the cavity).

In a second embodiment, the mould halves or mould arrangement is such that the mould halves move, flex or adapt to define therebetween a second, post-cure, mould cavity, which second post-cure mould cavity defines a greater lens diameter (or at least a greater annular ridge diameter) and preferably a greater curvature (greater radius) than said first pre-cure mould cavity. Additionally, or alternatively, according to the second embodiment, the mould arrangement or mould halves are such that during curing as they tend to be drawn together, at least the first mould half may flex, due to pressure applied at an annular ridge thereon by the surface of the second mould half, to accommodate the second mould half.

In another aspect and in a preferred embodiment of the aforementioned aspect and embodiments, the invention may be characterized by provision of mould halves in the form of open flexible cups which are not configured in a piston-cylinder slide-fit arrangement and/or which define such an annular ridge which is not rigid. Preferably, the mould halves engage in a ball and socket arrangement, the second, male, mould half optical portion being the ball abutting an annular ridge formed on the first, female, mould half defining the socket.

In each aspect, it is preferred that the male and female mould halves contact one another only via the annular ridge on one (preferably the female) mould half and a corresponding abutment zone on the other (preferably male) mould half. The abutment zone may be defined simply as that part of a mould half with which the annular ridge of the other mould half makes contact. In the preferred embodiments of the invention in which the annular ridge is formed on the first (female) mould half, the abutment zone is that part of the convex surface of the second (male) mould half which contacts the annular ridge of the first mould half when the two mould halves are in lens-forming engagement. The abutment zone may be considered to be the curved surface area between (and including) two line circumferences about the second (male) mould half, a first circumference corresponding to the contiguous annular point of contact of the annular ridge with the convex surface of the second mould half when the mould halves are in lens-forming engagement prior to curing and a second circumference corresponding to the contiguous annular point of contact of the annular ridge with the convex surface of the second mould half after curing (and monomer shrinkage) of the lens-forming composition. The first circumference may be smaller or larger than the second circumference depending upon the relative movement of the particular mould arrangement during curing. It is a particularly preferred feature that the abutment zone does not restrict, stop or fix relative movement of the first and second mould halves by providing a restriction, stop or fix to the annular ridge, and in case of the aforementioned embodiments that the abutment zone on the male mould half does not comprise a stop or restriction other than its curvature against the annular ridge on the female mould half. It is most preferred that the second mould half does not exhibit any discontinuity in curvature in the region thereof that is may engage with, preferably contact, the first mould half.

It should be noted that the annular ridge in accordance with the articles and methods of the present invention is preferably an integral part of the mould half (preferably female) on which it is formed and is preferably not capable of flexing entirely independently of the body of the mould half (even when it defines a slight return) in order to accommodate monomer shrinkage as would a flexible lip of the type described in the prior art (GB-A-1575694) (i.e. the annular ridge is not a flexible lip of the type in the prior art).

The methods of the invention further comprise separating the two mould halves on completion (or substantially on completion) of curing. Preferably, the mould halves may be separated, in one embodiment where both mould halves are formed of the suitably pliable material, by applying outward lateral pressure to the male mould half (or downward pressure to flanges formed on the male mould half). The male mould half may then be lifted away from the female mould half containing the pre-hydrated lens. Typically, a cured flash ring is withdrawn along with the male mould half.

In a preferred embodiment of the invention, the male and female mould halves of the mould arrangement may be configured in their radially outward portions (i.e. those portions of the male and female mould halves radially outward from the annular ridge), or peripheral (or tapered) portions, to have closely matching contours, preferably without touching, whereby the amount of materials that is required to make a flash ring is minimal. It is preferable that in accordance with the method of the invention that excess lens-forming fluid composition is applied to the lens-forming cavity such that excess fluid is expelled when the two mould halves are formed in a sealed lens-forming engagement, the expelled fluid collecting in a flash ring cavity defined by the space between the peripheral portions of the mould halves to form a complete flash ring of fluid. A complete flash ring ensures that sufficient fluid is provided for lens formation whilst preventing any atmospheric influences (e.g. oxygen seepage) on the edge portions of the curing lens.

The first and second mould halves should be placed in sealed lens-forming engagement after disposal of lens-forming composition in the lens-forming cavity. Preferably the first and second mould halves contact only between the annular ridge of one (e.g. the first) mould half and abutment zone of the other (e.g. the second) mould half. The lens-forming engagement should be achieved by applying sufficient force in bringing the first and second mould halves together (typically applied to the second, male, mould half when placed in the first, female, mould half) to cut the lens-forming composition (e.g. by the force being greater than applicable surface tension) in order to cause the annular ridge and abutment zone to come into contact and separate lens-forming composition from flash ring composition.

The female mould half according to the present invention and preferably utilized in the methods of the invention has, as discussed, an annular ridge and is sufficiently flexible that under curing conditions (to cure a contact lens-forming curable fluid composition) and in contiguous contact via the annular ridge with a male mould half, the female mould half may flex to at least an extent to accommodate any shrinkage of the composition. Preferably, the flexibility of the female mould half for accommodating shrinkage of lens-forming composition manifests itself in radial expansion or contraction of the annular ridge (i.e. increase or decrease in diameter of the annular ridge). The female mould half preferably has a curved optical portion radially inwards from the annular ridge and, preferably also, a tapered (or peripheral) portion radially outward from the annular ridge. The tapered zone may be defined at its perimeter by a rim, which preferably defines a plane substantially parallel with that defined by the annular ridge. Preferably, the mould half has a radially extending flange formed on the rim of the mould half (preferably extending in the plane defined by the circumference) so that it may be suspended by resting the flange on the boundary of an aperture (typically a circular aperture sized to receive the mould half) formed in a receptacle tray, which is preferably used in the manufacturing process to produce an array of contact lenses simultaneously. It is preferred that the female mould half is generally cup-shaped.

Preferably the annular ridge of the first (female) mould half is circular and preferably the optical portion of the female mould half (i.e. that portion radially inward from the annular ridge) is circularly symmetrical. The peripheral portion of the female mould half may be of any suitable or desirable shape, e.g. square, rectangular, lozenge-shaped, circular, provided that it does not impede the second (male) mould half from engaging with the first mould half in lens-forming engagement (e.g. an optical portion of the second mould half abutting against the annular ridge of the first mould half in a ball and socket arrangement). The peripheral portions of the first and female mould half need not be of common shape nor designed or configured for engagement with each other, but should preferably be configured so as not to prevent or impede engagement of the optical portions of the first and second mould halves. Thereby, there is considerable design freedom, particularly in the peripheral portions of the mould arrangement. (The optical portion of the male mould half preferably is configured for abutment against the annular ridge and the optical portion is preferably circularly symmetrical).

Preferably both the annular ridge and the rim of the first (female) mould half are circular. Furthermore, it is preferred that at least the optical portion of the first mould half is circularly symmetrical and preferably the mould half in its entirety is circularly symmetrical. This is beneficial in enabling the manufacturing process to be simplified and for packing efficiency (when the female mould half is utilized as a blister or a contact lens receptacle in contact lens packaging).

Preferably, the first mould half (or female mould half) used in the method of the invention is further characterized, in an embodiment in which the annular ridge is formed on the female mould half, by the first mould surface having a return, typically defined by the annular ridge (e.g. the radially-internal surface thereof), thereby allowing the pre-hydrated lens to be retained in the first mould half upon separation of the mould halves. In this embodiment, the method preferably further comprises releasing at least the edges of the pre-hydrated lens from the first mould half by applying a pressure to cause radial flexing of the annular ridge. It is particularly advantageous in a female mould half having a concave mould surface in which there is defined a return (e.g. by way of an annular ridge) that the cured, pre-hydrated lens may be released from the concave mould surface or at least have its edges released from the portion of the surface defining a return since hydration is much more predictable, controllable and faster and there is less risk of edge damage or lens inflexion if the edges of the pre-hydrated lens are released prior to hydration. This is of particular importance for highly automated manufacturing processes where an array of lenses may be manufactured at the same time and subject to simultaneous pre-programmed process steps. Should some lenses in an array of lenses not properly hydrate or not properly hydrate within the programmed time, it can result in inadequate hydration or damage to the lens and thus a reject lens or reject array. It is thus provided in a further aspect of the present invention a female mould half having an annular ridge and a concave mould surface radially inward thereof, the concave mould surface to correspond with a convex surface of a pre-hydrated lens to be formed therein, wherein the annular ridge defines a return on the concave mould surface and which annular ridge or mould half is sufficiently flexible that it may be flexed sufficiently to release the edges of a cured pre-hydrated lens formed against the concave mould surface.

Preferably the return may be defined by a tangent on the curved surface of the concave mould surface where it meets the annular ridge, the tangent having an angle to the plane of the annular ridge of from 10 to 80° (an angle of 90° or greater corresponding to their being no return provided), preferably from 30° to 60° and most preferably about 45°. Preferably, the return should define a curved surface extending smoothly from the concave surface of the first mould half (although an angled return can be provided, in which case the 'tangent' referred to should be a line from the widest point to the annular ridge). The extent of the return, being the distance from the widest point (corresponding to the diameter of the pre-hydrated contact lens being formed) to the annular ridge should be such as to allow the pre-hydrated contact lens to be retained within the first mould half after separation of the mould halves, but also to allow the edges of the pre-hydrated lens to be released by flexing the first mould half. Ideally, the extent of the return is up to 10 μm, preferably in the range 4 to 6 μm.

The method of the invention preferably further comprises subsequent process steps carried out within the first (or female) mould half in which it is formed. Most preferably, the first (or female) mould half is subsequently utilized as a blister cup for a contact lens package. Thus, the method preferably further comprises hydrating the lens in the first mould half to form a hydrated lens and, optionally, washing the hydrated lens in the first mould half. The hydration and washing fluid is typically water or a preservative or saline. The method preferably comprises the further step of providing a quantity of preservative fluid (e.g. saline solution) into the first mould half and applying a sealing foil to a rim of the first mould half defining an internal volume containing the hydrated lens, whereby the first mould half forms a blister cup of a packaged contact lens. It is particularly advantageous to carry out further process steps in the female mould half in which the lens is formed and to utilize the female mould half as a blister cup in a contact lens package since this reduces the amount of contact with the contact lens and thus the risk of any contact-mediated contamination (albeit that risk is typically small in an efficiently and well-run manufacturing operation) is minimized and the use of materials is reduced. In particular, normally mould halves are disposed of or recycled and separate blister cups are manufactured which are typically disposed of by the user. By utilizing the mould half as a blister cup, material waste may be minimized.

During the mould arrangement engagement process or curing process at least one mould half should be unconstrained relative the other. Typically both may be free to move. For example, first (female) mould halves are preferably suspended by flanges from the rim thereof in an aperture formed in a tray (apertures preferably being of a size to allow expansion of mould arrangement during curing if necessary). Preferably, the second (male) mould halves are simply deposited on top and lightly pressed sufficient to cut the lens-forming composition and to cause sealed engagement. At least one (and preferably both) of the mould halves should be free to float or centre with respect to the other. A plurality of female mould halves can be formed in a perforated tray with the male mould halves provided in unconstrained engagement with the female mould halves. Preferably however the female mould halves are also unconstrained and may ultimately be formed in a blister by application of a foil to a plurality of mould halves.

According to the present invention, the flexibility of the mould arrangement whereby the volumetric reduction during curing is accommodated may be provided by radial flexibility of the first (female) mould half (e.g. including radial contraction or expansion of the annular ridge of the female mould half) and, optionally, diaphragm flattening of the female mould half, contraction of the curved optical portion of the female mould half or more likely diaphragm expansion of the convex mould surface of the second (male) mould half. Preferably, the flexibility of the mould arrangement is provided substantially by radial flexibility and substantially not by diaphragm behavior, by which it is meant that the volume reduction that is accommodated by the flexibility is no more than 10% attributable to diaphragm behavior and preferably no more than 5% and most preferably involves no diaphragm behaviour.

As mentioned above, in the mould arrangement described, the first and second mould halves together define a pre-cure cavity and, after curing of the contact-lens forming fluid composition, a post-cure cavity. In one embodiment according to a first embodiment described above in which there is radial contraction of the annular ridge of the female mould half, the post-cure cavity may have an annular ridge with a diameter d of δd less than that of the pre-cure cavity. Preferably, δd is in the range 2 to 200 μm, more preferably from 5 to 100 μm, still more preferably from 25 to 80 μm and most preferably from 40 to 75 μm. Such annular ridge diameter (or cavity) contraction would be preferably for a total diameter of ~10.5 mm. The percent contraction is preferably in the range 0.1 to 1%, preferably 0.5 to 0.8%. Preferably according to this embodiment, the concave mould surface and the convex mould surface move diametrically toward one another (e.g. by flattening of the dome of the first, female, mould half and/or by doming of the second, male, mould half) thereby reducing the thickness of the pre-cure cavity by from 2 to 20%, preferably from 5 to 15% and more preferably about 10%.

In another embodiment in which there is radial expansion of the annular ridge of the female mould half (thereby allowing the concave and convex surfaces to move toward one another), the post-cure cavity may have a diameter d of δd greater than the pre-cure cavity. Preferably, δd is in the range 2 to 50 μm, more preferably from 3 to 20 μm and still more preferably at least 5 μm. Preferably, the female mould half as defined herein is capable of flexing under the internal forces induced by monomer shrinkage during polymerization, such as to increase the annular ridge diameter by at least 3 μm, preferably at least 5 μm, optionally at least 10 μm, more preferably in the range from about 5 μm to about 50 μm and most preferably in the range from about 5 μm to about 20 μm.

The first (female mould half), for use in the method of the invention and which may be used as a blister cup of a contact lens package, preferably comprises an annular ridge which is not rigid and has radial flexibility which may be defined as allowing an increase in diameter of the annular ridge upon application of a force (which is preferably a force that is within the elastic limit of the mould half, by which it is meant that on removal of the force, the mould half returned to its original state). Preferably, the flexibility may be defined as allowing an increase of at least 5 μm when a force of no more than 350 N, preferably no more than 250 N, more preferably no more than 200 N, and still more preferably no more than 100 N is applied between fixed platen arranged to contact a rim of the mould half and an external base of the mould half.

The first (female) mould half should be sufficiently rigid to be self supporting and sufficiently rigid to substantially hold its shape during the curing phase whilst being flexible enough to accommodate the volumetric reduction during curing. For example, the first (female) mould half may be defined as having a rigidity whereby at least 10 N, preferably 25 N, force is required to be applied according to the platen arrangement referred to above in order to cause a radial expansion of the annular ridge of at least 5 μm.

In the embodiments of the invention described herein in which the annular ridge is formed in the first (female) mould half, there may be defined a first portion being an optical portion radially inward from the annular ridge and a second portion, being a tapered or peripheral portion radially outward from the annular ridge. Preferably, the peripheral portion is configured such as to allow containment of a hydrated lens and to allow the hydrated lens to rest unencumbered in contact with the annular ridge. Where the tapered peripheral portion defines a curve, it is preferred that the curve has a radius of curvature of similar to or greater than the radius of the front curve of a hydrated lens. Preferably the first, optical, portion defines a curve with a smaller radius than the curve of the front surface of a hydrated lens and has a smaller diameter than the hydrated lens.

Preferably, the first (female) mould half has a rim (which is preferably substantially in a plane parallel to the annular ridge) that defines an internal volume of the mould half. The female mould half may preferably be configured (as a female mould half for use in manufacture of a lens and/or as a female mould half used as a blister cup of a contact lens package) to possess one or more of the following characteristics:

a) a circularly symmetrical internal volume relative the rim;

b) a curved second portion radially outward from an annular ridge formed on the first mould half, which curved second portion has a radius of curvature of 10 mm or less, preferably from 8.5 mm to 9 mm;

c) a curved second portion radially outward from an annular ridge formed on the first mould half, which curved second portion has a radius of curvature equal to or within plus or minus 200 μm of the front optical zone radius for a hydrated −3.00D lens;

d) a ratio of the radius of the rim of the mould half to the lens back optical zone radius of the hydrated lens is less than 1.2, and preferably less than 1.1;

e) the maximum internal height of the internal volume from an annular ridge formed on the female mould half to the intersection with the rim diameter is 6 mm or less;

f) the vertical clearance between the lens sagittal height and the internal height of the internal volume from an annular ridge formed on the female mould half to the intersection with the rim diameter is 2.5 mm or less, preferably 2.2 mm or less or even 2.1 mm or less.

g) the ratio of the maximum internal height of the internal volume from an annular ridge formed on the female mould half to the intersection with the rim diameter to the front sagittal height of a hydrated lens is 1.6 or less.

h) the diameter of the rim is 18 mm or less and preferably 17 mm or less;

i) the ratio of the diameter of the rim to the diameter of a hydrated lens is 1.4 or less and preferably 1.3 or less, more preferably 1.25 or less and most preferably 1.2 or less.

Optionally any two or more of the above features a) to i) may be provided and preferably all of features a) to i). By configuring the female mould half having these one or more features a) to i), a compact female mould half may be achieved, which when utilized also as a blister cup of a contact lens package, is capable of being compactly packaged, minimizes the use (and waste) of material and reduces the likelihood of a contact lens inverting in the packaging.

The internal volume as defined by the rim of a female mould half is preferably in the range 0.75 to 1.5 ml, more preferably 0.8 to 1.25 ml, still more preferably 0.8 to 1.1 ml and most preferably 1 ml or less. In one embodiment, the female mould half has a volume in the range 0.8 to 0.9 ml, e.g. about 0.85 ml.

Preferably, a female mould half as described above may be utilized as a blister cup of a contact lens package.

The mould halves may be formed of any suitable material according to the predictability or consistency of behaviour during moulding and processing, the conditions of curing, the nature of the lens-forming fluid composition used in the manufacture of contact lens and the requirements of flexibility as discussed herein. In one embodiment, the female mould half is formed of a material capable of providing a necessary degree of flexibility to allow contraction to accommodate monomer shrinkage or to expand to allow receipt of the male mould half to satisfy monomer shrinkage during curing. The male mould half may be made of the same or different material, which may be a different rigid material (e.g. a cast metal mould, glass mould or rigid plastic) but is preferably the same material as the female mould half. Typically, e.g. for thermal or UV curing (and typical lens-forming material), the mould halves may be formed of polyolefins such as polyethylene and polypropylene, polystyrene, polycarbonate, polymethyl methacrylate, a copolymer of ethylene and vinyl alcohol, polyacetal, polyamide, polyester and polysulfone. Preferably, the mould halves comprise of propylene-containing polymers or co-polymers. More preferably, the mould halves are formed of or comprise polypropylene.

The contact lens-forming composition may be any suitable composition (e.g. any suitable composition known in the art) capable of being cured to form a contact lens. Preferably, the composition comprises a material capable of thermal or UV curing to form a contact lens, preferably thermal curing. The contact-lens forming composition may, for example, be such as to form contact lenses of the silicone hydrogel class of materials, examples of which are known in the contact lens art. The contact-lens forming composition may typically comprise a radically polymerisable monomer compound, or alternatively a macromer or a pre-polymer. Such compounds for radical polymerisation to form a contact lens may be selected, for example, from one or more of vinyl, allyl, acryl and methacryl groups. Example compounds may include methacrylates such as alkyl methacrylate, siloxanyl methacrylate, fluoroalkyl methacrylate, hydroxyalkyl methacrylate, polyethyleneglycol methacrylate and polyhydric alcohol methacrylate, derivatives of styrene, and N-vinyllacatm. In one embodiment, the contact lens-forming composition comprises polymerisable hydroxyalkyl methacrylate (such as hydroxyethyl methacrylate) monomers (or pre-polymers) optionally in combination with one or more further polymerisable co-monomers, such as vinyl pyrrolodone or a methacrylic acid. The contact lens-forming composition typically further includes a polymerization initiator, such as a thermal polymerization initiator or photopolymerisation initiator and optionally a photosensitizer.

In a further aspect of the invention discussed above, there is provided a packaged contact lens comprising a blister cup containing a hydrated contact lens of pre-determined hydrated curvature, a preservative solution, and a foil cover sealed to the rim of the blister cup, the blister cup comprising an annular ridge on its interior surface and a curved optical portion radially inwards from said annular ridge said curved optical portion having a curvature less than that of the hydrated contact lens, characterized in that on the application of a force upon the annular ridge, the material of the curved optical portion is caused to flex whereby the radius of curvature of said curved optical portion is caused to increase and/or the diameter of the annular ridge is caused to increase.

In a still further aspect, there is provided a packaged contact lens comprising a blister cup containing a hydrated contact lens of pre-determined hydrated curvature, a preservative solution, and a foil cover sealed to the rim of the blister cup, the blister cup comprising an annular ridge on its interior surface and a curved optical portion radially inwards from said annular ridge said curved optical portion having a radius of curvature less than that of the hydrated contact lens, characterized in that the blister cup comprises a peripheral portion that comprises a shallow taper whereby the contact lens may rest unencumbered on the annular ridge. Preferably, the peripheral portion is curved and the curved peripheral portion defines a curvature greater than that of the curved optical portion.

The packaged contact lens preferably comprises a blister cup having substantially similar characteristics to a female mould half as described in detail above and, preferably, the described flexibility thereof. More preferably, the packaged contact lens comprises a blister cup which is a mould half used in manufacturing of the contact lens.

The packaged contact lens is preferably formed as an array. Optionally, the array may comprise a plurality of blister cups formed on a single (optionally perforated) foil sheet sealed to rims defining the internal volume of the blister cups. The array of packaged contact lenses is preferably arranged such as to allow two arrays of packaged contact lenses to be packed blister-to-blister such that the respective foils are separated by up to 15 mm, preferably up to 12 mm, more preferably in the range 5 to 10 mm and most preferably up to 8 mm. Optionally, the array of packaged contact lens is configured, with preferred circular rimmed blister cups, such that the separation between adjacent blister cups in an array is in the range 2-6 mm.

In a preferred embodiment, an array of packaged contact lenses comprises an array of 3 by 5 lenses or an array of 4 by 4 lenses, whereby a monthly supply of daily disposables may be packaged and dispatched as four foils (e.g. in packs of two foils) or as required by the user.

In a further aspect of the invention described above, is a method for the design of a contact lens manufacturing process, the method comprising providing a mould design comprising a first mould half and a second mould half and therebetween defined a lens-forming mould cavity, the first mould half having an optical surface to correspond with a convex surface of a contact lens, the second mould half having an optical surface to correspond with a concave surface of a contact lens, the first and second mould halves in unconstrained engagement; selecting a first material for use in manufacture of a first mould half; selecting a second material for use in manufacturing a second mould half; casting a plurality of first and second mould halves each first and second mould half pair defining a specific lens-forming mould cavity having certain dimensional characteristics; selecting a lens-forming composition for use in manufacturing a contact lens; manufacturing a plurality of contact lenses utilizing the plurality of first and second mould halves according to the mould design, said manufacture being according to certain cure and post-cure treatment conditions; recording certain lens characteristics; and devising therefrom an empirical relationship between mould half dimensions and desired lens characteristics for use in sizing of mould halves in a contact lens manufacturing process.

A contact lens having predetermined lens characteristics may then be manufactured by selecting a lens-forming composition for use in manufacturing the contact lens, providing first and second mould halves of dimensions determined according to an empirical relationship determined for that lens-forming composition by the above method, arranging said mould halves in a mould half arrangement defining a lens-forming cavity, disposing the lens-forming composition in the lens-forming cavity, curing said composition to form a pre-hydrated lens, separating the first and second mould halves and hydrating the pre-hydrated lens to produce a contact lens of pre-determined lens characteristics.

In a still further aspect of the invention is a method of designing a contact lens manufacturing method, which comprises selecting a contact lens mould size according to a desired optical strength and desired diameter of contact lens, the method comprising selecting a desired optical strength and diameter of contact lens, selecting a material from which to form the contact lens and according to pre-determined volumetric reduction during curing of that material selecting a contact lens mould of a size and material to account for the pre-determined volumetric reduction for the lens-forming material, the size of said contact lens mould being determined according to the predetermined tolerances and flexibility of the mould. According to this method, a contact lens manufacturing process is established by working back from allowed tolerances in the materials to be used to form the contact lens and the materials to be used to form the mould halves according to proposed curing conditions, e.g. in performing a method of manufacturing a contact lens as hereinbefore defined, rather than imposing restraints on the manufacture of contact lenses and materials and configurations of mould halves.

The method further comprises, for each type of contact-lens forming material and each type of mould material, establishing a set of experimentally determined tolerances which may be applied to design selection.

Accordingly, greater freedom in contact lens manufacturing processes are afforded and less complex manufacturing processes may be achieved (without the need to build in limitations and restraints). Thus a simpler mould cast design may be achieved—the open dish (with non-rigid annular ridge) as described above. This is a fundamentally novel approach to contact lens mould design with the object of meeting the requirements.

By utilizing the mould arrangement described herein, which has an open (or ball and socket) arrangement in which the mould halves are unconstrained (as compared for example with prior art piston-cylinder arrangements) and therefore have peripheral portions that do not require precision manufacture, the physical effect of changes in materials or conditions can be readily accounted for simply by allowing physical properties resulting from material or process changes to be accommodated in the manufacturing process by establishing an empirical relationship as described above, for example. Since the peripheral portions are not subject to particular constraint and the operation of the process not reliant on precise manufacturing to meet such particular constraints, changes in materials, process or design can be readily accommodated. Thus, the mould halves and manufacturing methods of the present invention allow a significant degree of design freedom, such as the selection of lens diameter, hydration, lens material, mould material, curing conditions without significantly adjusting the manufacturing process, but simply by establishing a deviation factor to be accounted for when sizing the mould half master.

The invention will now be described in more detail, without limitation, with reference to the accompanying Figures.

In FIG. 1, a contact lens mould arrangement 1 comprises a first, female, mould half 3 and second male mould half 5 configured for engagement to form between a convex surface 7 of the male mould half 5 and a concave surface 9 of the female mould half 3, a first pre-cure mould cavity (shown in FIG. 2), the perimeter of which is defined by an annular ridge 13 formed on the female mould half 3, which is designed to not prevent flexibility of the lens half (i.e. is not rigid).

The female mould half is preferably provided with a narrow collar or flange 15 to allow the mould arrangement 1 to rest in an array supported only by the collar 15 thereby allowing free relative movement of the mould halves during manufacture.

Figure 2:
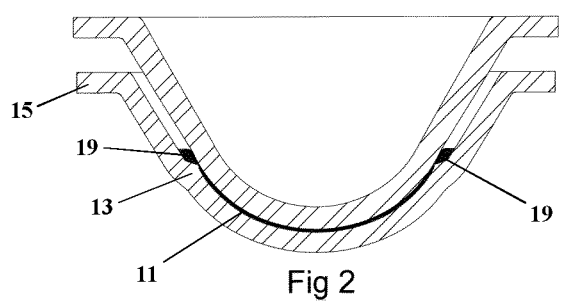
Figure 3:
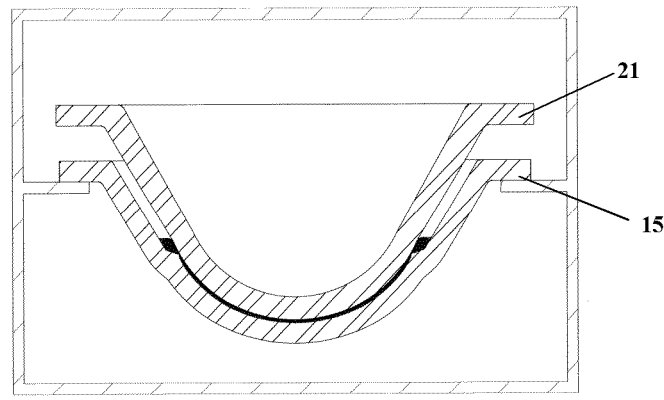

A lens-forming composition 17 (typically comprising a polymerisable monomer) is charged into the female mould half 3 in an amount slightly more than sufficient to fill the first pre-cure mould cavity 11 whereby excess composition 17 is displaced into flash-ring cavity 19 when the mould halves are brought into lens-forming engagement as in FIG. 2.

The mould halves may then be left to self-align during curing or may first be simply aligned by applying a slight plate pressure (parallel with the flat surface of narrow collar 15) to the top of the male mould halves, which alignment step may be assisted by the provision of a narrow collar 21 on the male mould halves 5 which corresponds with the narrow collar 15 of the female mould halves 3. Preferably, an array of such mould arrangements is provided and a single plate alignment step can be carried out. Such alignment pressure should be sufficient to ensure that the collars are parallel and sufficient to cause the annular ridge to contact the abutment zone of the male mould half thereby separating the 'wet flash ring' from the 'wet lens' (i.e. cutting the lens-forming composition).

Preferably, the only point of contact between the female mould half 3 and the male mould half 5 is line contact between the annular ridge 13 on the female mould half 3 against the convex surface 7 of the male mould half. The mould halves are formed of a flexible material which allows contraction or expansion of the mould halves (e.g. lateral or radial expansion or contraction of the annular ridge 13 under curing conditions). In addition, for example, under applied pressure against the annular ridge 13 the female mould half 3 may be caused to flex laterally (thereby increasing the diameter of the annular ridge 13 and flattening the curvature of the concave surface 7). Optionally, the male mould half may also be capable of some flexibility (lateral contraction) whereby the curvature of the convex surface is increased and optionally, but less preferred, some diaphragming may occur.

The composition 17 is then cured by application of heat (where the composition is heat curable) or UV light (where the composition is UV curable), for example. During curing, the inevitable reduction in volume of the composition 17 (monomer shrinkage) has the effect of an applied pressure on the mould arrangement. The pressure causes the allowed flexibility of the female mould half 3 and optionally the male mould half 5 to adapt thereby accommodating the reduction in volume of composition 17 during curing.

Figure 4:
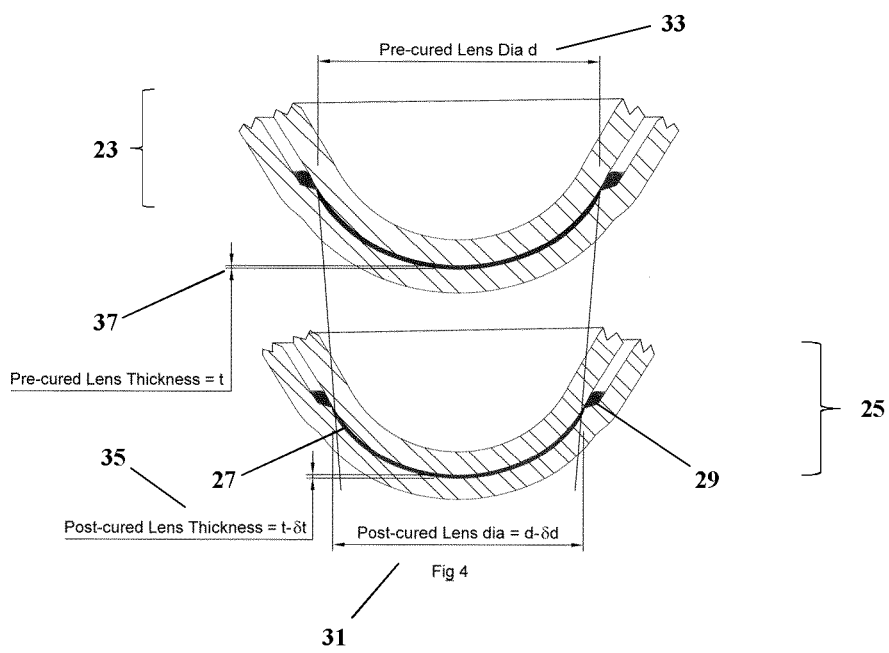

As can be seen in FIG. 4, a pre-cure mould arrangement 23 is shown along with a post-cure mould arrangement 25. As can be seen, a post-cure mould cavity 27 is defined and contains a cured hard lens, whilst a cured flash ring 29 is formed in the flash ring cavity 19. The post-cure mould cavity 27 has a post-cure diameter 31 (i.e. the diameter of the hard lens formed and the diameter of the annular ridge 13 in the post-cure arrangement 25), which may be designated d', that is smaller by an amount $\delta d$ than the pre-cure diameter 33 (i.e. the diameter of the pre-cure mould cavity and the annular ridge 13 before the cure process), which may be designated d. Further, the post-cure lens thickness 35, which may be designated t', is less than the pre-cured cavity thickness 37, by an amount $\delta t$. Accordingly, in order to obtain a hard cured lens having a certain radius of curvature (back and front), thickness and lens diameter, male and female mould halves 3,5 are selected that have corresponding curvatures, annular ridge diameter and in lens forming engagement a pre-cure cavity thickness that respectively account for the changes that are allowed to occur by the unconstrained arrangement during curing.

The mould halves may be separated by applying pressure to the collar 21 of the male mould half 5 (until an audible 'crack' occurs). On removal of the male mould half 5, the cured flash ring 29 may separate with the male mould half 5 (due to differences in surface properties between the male mould half 5 and the female mould half 3 or to differences in pressure applied to the flash ring, which upon release may effectively be gripped by the male mould half 5) or be independently removed. A return 39 (shown in FIG. 5) may be provided on the female mould half 3 in association with the annular ridge 13, which has the benefit of a more rounded front edge of the lens formed (for better comfort in the eye of the wearer) and the further benefit that on separation of the male mould half 5, the cured pre-hydrated lens 41 remains with the female mould half 3.

Figure 6:
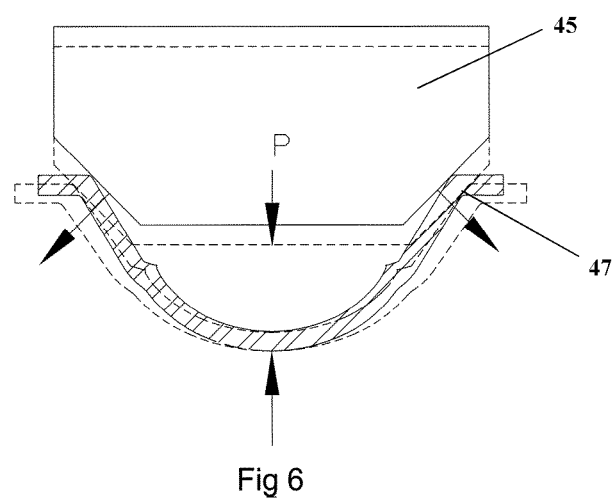
Figure 7:
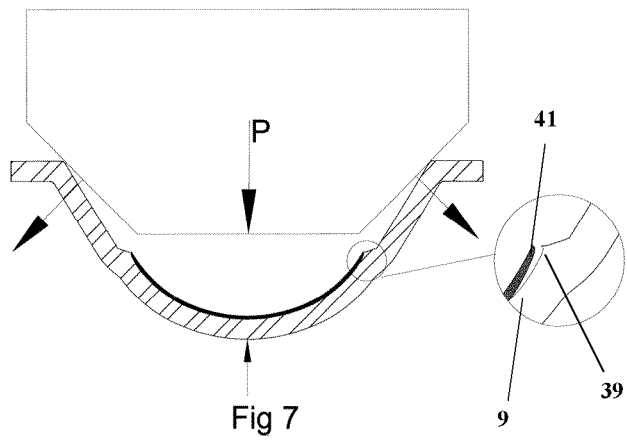

In order to hydrate the pre-hydrated lens 41, it is preferred to first release the lens from the optical zone 43 of the female mould half 3 (since hydration is quicker, more consistent and less likely to cause damage to the edges of the lens if it is allowed to occur through the edges and both surfaces of the lens rather than simply through the back surface of the lens). Accordingly, the separated female mould half 3 containing the pre-hydrated lens 41 may be flexed laterally (see FIG. 6) by, e.g. applying pressure using a frusto-conical insert 45 shaped to apply pressure to the perimeter 47 of the female mould half 3 causing the edges of the pre-hydrated lens to be released from the return 39 formed in the optical surface 9 of the female mould half 3, as shown in FIG. 7.

Figure 8:
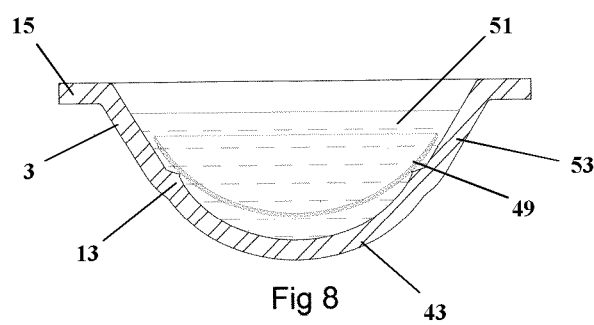

FIG. 8 shows a hydrated lens 49 in a hydration liquid 51, which is preferably water, in the female mould half 3. The pre-hydrated lens 41 may have expanded by 25 to 50% (depending upon the lens material selected) during hydration. The diameter of the hydrated lens 49 is thus larger than that of the pre-hydrated lens 41 and of the annular ridge 13 and therefore extends into a volume of the female mould half 3 that may be referred to as a tapered or peripheral portion 53 since it tapers from the optical portion 43 to the perimeter 47. The peripheral portion 53 should be so configured (i.e. tapered or curved) to allow containment of the hydrated lens 49 and to allow the hydrated lens 49 to rest unencumbered in contact with the annular ridge 13, which has the benefit of maintaining separation between the lens 49 and the mould surface. Since the hydration liquid 51 may contain unpolymerised 'residuals' extracted from the pre-hydrated lens 41 and the optical portion 43 of the female mould half 3, the hydration liquid must be removed prior to the addition of the packing solution 52 (see FIG. 9)

Figure 13:
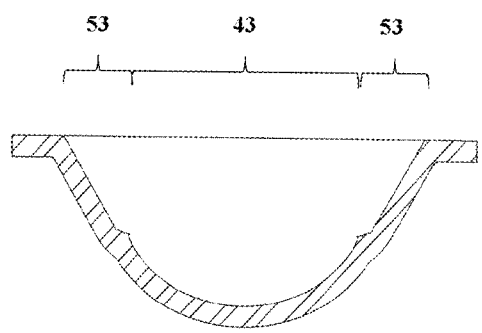
FIG. 13 illustrates in cross-section a female mould half of one embodiment of the present invention.
Figure 14:
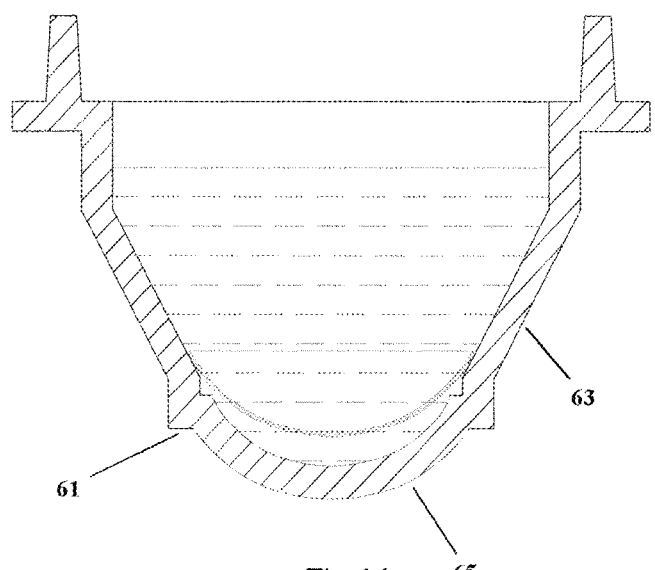
FIG. 14 illustrates in cross-section a prior art female mould half overlain with a hydrated contact lens.

FIG. 9 shows the hydrated lens 49 in a packing fluid 52, which can be saline or any comfort enhancing fluid compatible with the physiology of the human eye, and the mould half 3 provided with a foil lid 55 attached to the narrow collar of the female mould half 3, in which the female mould half 3 is being used as a blister for a contact lens package 57. This assembly is typically sterilized by autoclaving or some other sterilizing process. As mentioned above, this female mould half 3 utilised as a blister of a contact lens package 57 is characterized by having an optical portion 43 having an optical concave surface 9 of a size and curvature selected to provide through the curing process described a pre-determined size and curvature of pre-hydrated contact lens 41 which corresponds to a desired size and curvature of a hydrated contact lens 49 and a tapered or peripheral portion 53 which tapers radially outward from the annular ridge 13 in a shallow angle or curve to allow the hydrated lens 49 to rest on the annular ridge 13. That is, the angle or curve of the peripheral portion 53 should be shallower than the curve of the parts of the lens occupying that region (i.e. the mid-periphery or periphery of the hydrated lens 49). This is as distinct from prior art arrangements where the female mould half is proposed for use as a blister for a contact lens package—for example, WO-A-87/04390 which is shown in FIG. 14 has a rigid shoulder 61 (for preventing flexibility and in particular radial flexibility or expansion) and has a tapered portion 63 which tapers steeply away from the optical portion 65 in a manner that would not allow a contact lens to rest in the base of the blister and would require a blister of substantially greater volume. FIG. 13 illustrates in more detail the shallow taper in the peripheral portion 53 of the invention.

FIG. 10 shows an opened blister 59 (i.e. female mould half 3) with the user's finger 61 contacting the back surface of the hydrated lens 49. Due to separation of the hydrated lens from the curve of the package by resting on the annular ridge 13, the contact lens 49 readily adheres (preferably) to the finger and allows the lens 49 to be removed from the blister 59 (as illustrated in FIGS. 10-12). Downward pressure of the soft tip of the finger 61 does not result in any damage to the soft lens 49 by the annular ridge 13 since there is a retained 'pool' of packaging liquid in the optical portion cavity, which pool of liquid prevents downward pressure of the lens 49 against the annular ridge. The pool of liquid also ensures preferential adhesion of the wet lens to the finger tip 61 and enhances removal of the lens 49 by the user.

Figure 15:
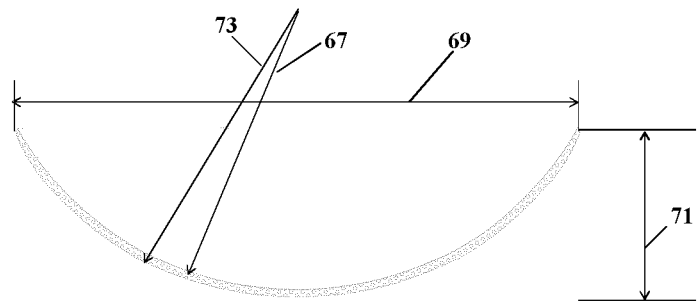
FIG. 15 illustrates a contact lens in cross section and the key dimensions thereof.

FIG. 15 shows a lens 49 and the dimensions related to it. In particular, the lens back optical zone 67, lens diameter 69, the front sagittal height 71 and the lens radius 73.

Figure 16:
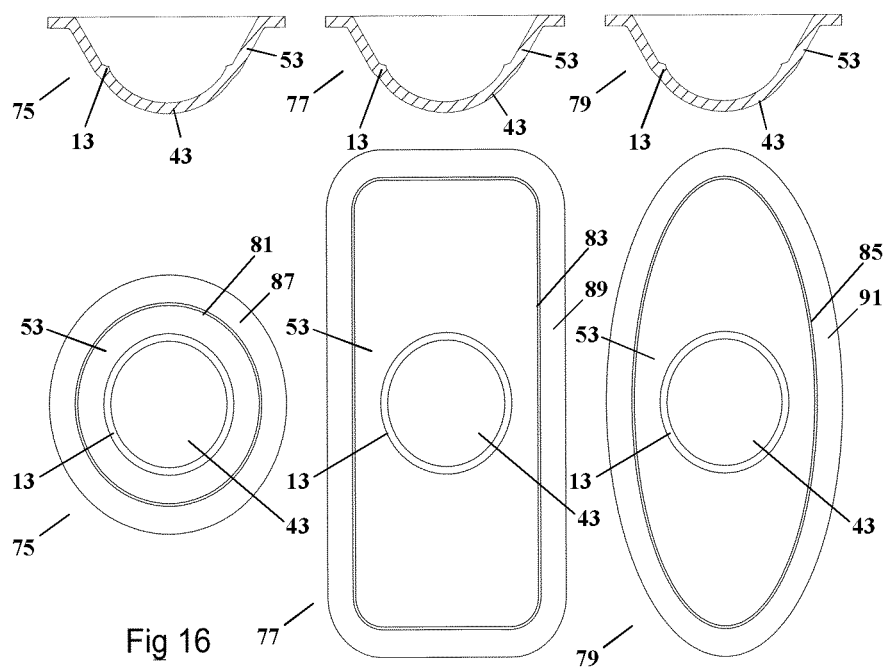
FIG. 16 illustrate in cross-section and in plan three embodiments of a female mould half/blister cup of the present invention having circular, rectangular and oval shapes.

In FIG. 16 is shown in cross section and plan three profiles of female mould halves/blister cups that may be used in accordance with the present invention. Respectively a circular mould half 75, rectangular mould half 77 and oval shaped mould half 79 are shown beneath their cross-sectional profiles. Each has an optical portion 43 which is circularly symmetrical and defined by an annular ridge 13. The peripheral portion 53 may be of any suitable shape to allow a second, male, mould half to engage in sealed lens-forming engagement against the annular ridge 13. Respective peripheral portions 53 are defined by a circular rim 81, rectangular rim 83 and oval rim 85, each provided with a flange 87, 89, 91. Accordingly, the shape of the peripheral portion 53 of the mould half/blister cup is not critical to the lens-forming step and need not be manufactured for precision piston-cylinder fit with another part, thereby enabling freedom of design of the mould half according to the requirements/desires of a blister cup.

Figure 5:
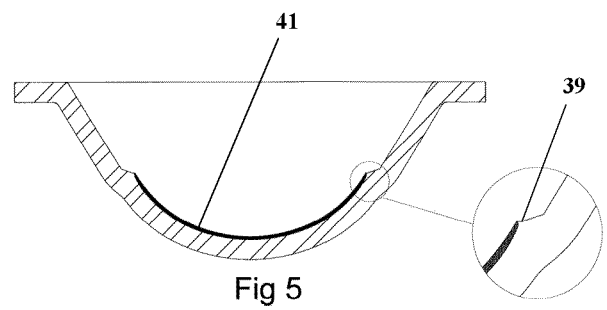
Figure 17:
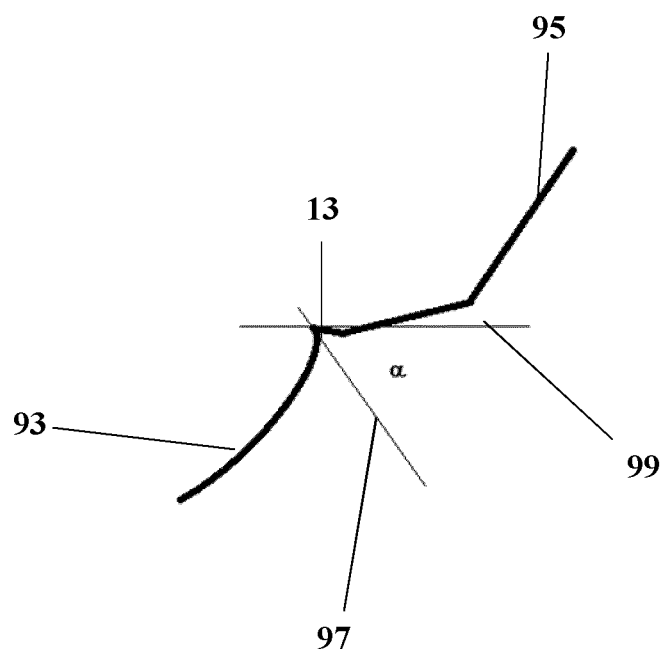
FIG. 17 illustrates the angle of a return formed on a mould half in a preferred embodiment.

In FIG. 17, the return 39 of FIG. 5 is shown in more detail. The curved surface of the concave mould surface 93 of the female mould half meets the peripheral portion surface 95 at the annular ridge 13. A tangent 97 to the curved surface 93 at the ridge 13 forms an angle α with the plane 99 of the annular ridge. An angle α of less than 90° defines a return. Preferably, α is in the range 10 to 80°.

EXAMPLE

Example 1

A pre-hydrated contact lens is formed using the method of the present invention by disposing a quantity of lens-forming composition (comprising hydroxyethyl methacrylate and vinyl pyrrolidone) in a lens-forming cavity formed between male and female mould halves (of polypropylene) of the invention, in accordance with FIG. 1, and thermally curing the composition. The diameters of the pre-cure mould cavity, post-cure mould cavity and dry lens formed were recorded and are presented in Table 1.

TABLE 1

| Moulding No. | Pre-cure mould cavity diameter/ mm | Post-cure mould cavity diameter/ mm | Pre-hydrated lens diameter/mm |
| --- | --- | --- | --- |
| 1 | 10.5879 | 10.5518 | 10.553 |
| 2 | 10.5954 | 10.496 | 10.517 |
| 3 | 10.5658 | 10.5222 | 10.527 |
| 4 | 10.5846 | 10.549 | 10.549 |
| 5 | 10.5864 | 10.5078 | 10.54 |
| 6 | 10.5626 | 10.49 | 10.53 |
| Mean | 10.5805 | 10.5195 | 10.5360 |
| STDEV | 0.0132 | 0.0264 | 0.0138 |

The mean change in diameter of mould cavity is a 60 μm reduction, which is a 0.58% contraction on a 10.58 mm aperture. This resulted in approximately 10% volume reduction.

The free and flexible mould arrangement of the present invention is capable of flexing or adapting to accommodate the volume reduction due to curing.

Example 2

As discussed above, a particular characterization of the manufacturing method, the female mould half 3 and the blister 59 of the present invention is the flexibility of at least the female mould half to lateral flexibility or radial extension. It is preferable that at least the female mould half it is sufficiently flexible that a return may be configured in the optical surface of the female mould half, associated with the annular ridge, whilst enabling the cured pre-hydrated lens to be released.

The following sets out the deformation under varying loads for a female mould half formed according to a preferred embodiment of the present invention.

A female mould half according to a preferred embodiment was placed between fixed and moving platens. Force was therefore applied equally in one direction against the narrow collar 15 of the mould half 3 and in the other direction against the external surface of the domed optical zone 43 of the mould half 3.

When compressive Forces of 0, 50, 100 and 200 N were applied, changes in the diameter (Δd) were recorded. The results are set out in Table 2.

TABLE 2

| Force F/N | Diameter (d)/mm | Δd/μm |
|---|---|---|
| 0 | 10 | 0 |
| 50 | 10.005 | 5 |
| 100 | 10.021 | 21 |
| 200 | 10.031 | 31 |

As can be seen from the data in Table 2, the diameter of the annular ridge increases with increasing pressure applied to the female mould half 3 illustrating that the mould half is flexible and that the annular ridge is flexible under a load and not rigid. It has been found that an increase in diameter of the annular ridge of 5 microns is sufficient to release from the return in the female mould half the edges of the pre-hydrated lens whereby uniform and efficient lens hydration step can be carried out in situ.

The invention has been described with reference to a preferred embodiment. However, it will be appreciated that variations and modifications can be effected by a person of ordinary skill in the art without departing from the scope of the invention.

The invention claimed is:

1. A female mould half comprising an annular ridge, wherein the female mould half has a degree of flexibility such that under curing conditions and in contiguous contact via the annular ridge with a male mould half, the female mould half, including the annular ridge, is configured to flex as a result of any shrinkage of lens-forming monomer composition during curing, wherein the annular ridge is configured to flex radially, and wherein the female mould half comprises a first concave mould surface to correspond with a convex surface of a contact lens and comprises a curvature to correspond with a pre-determined lens power/curvature.

2. The female mould half of claim 1, the wherein the annular ridge defines a return on the concave mould surface, and wherein the annular ridge, including the return, is configured to flex be to release the edges of a cured pre-hydrated lens formed against the concave mould surface.

3. The female mould half of claim 2, wherein the return is defined by an angle of a tangent to the curve of the concave mould surface as it meets the annular ridge to the plane of the annular ridge in the range of from 10° to 80°.

4. The female mould half of claim 2, wherein the annular ridge is configured to radially contract by 3 to 100 μm under curing conditions and/or extend by about 3 to 20 μm under applied pressure in order to release a cured pre-hydrated lens formed in said female mould half.

5. The female mould half of claim 2, wherein the annular ridge comprises a radial flexibility defined as allowing an increase in the diameter of the annular ridge of at least 50 μm when a force of no more than 200 N is applied between fixed platen arranged to contact a rim of the mould half and the base of the mould half.

6. The female mould half of claim 1, which exhibits no discontinuity in flexibility across its first mould surface.

7. The female mould half of claim 1, characterized in that it has a degree of flexibility under curing conditions such that during curing, the radial dimension is defined by the diameter of the annular ridge changes to accommodate the volumetric reduction of lens-forming composition due to curing.

8. The female mould half of claim 1, wherein the female mould half comprises a first portion, being an optical portion radially inward from the annular ridge, and a second portion, being a peripheral portion radially outward from the annular ridge, wherein the peripheral portion is configured such as to allow containment of a hydrated lens and to allow the hydrated lens to rest unencumbered in contact with the annular ridge.

9. The female mould half of claim 8, wherein the second portion defines a curve with similar or greater radius than a hydrated lens and the first portion defines a curve with a smaller radius than a hydrated lens and has a smaller diameter than the hydrated lens.

10. The female mould half of claim 1, which comprises a rim that defines an internal volume of the mould half and possesses one or more of the following characteristics:
   a) a circularly symmetrical internal volume relative the rim;
   b) a curved second portion radially outward from an annular ridge formed on the first mould half, which curved second portion has a radius of curvature of 10 mm or less;
   c) a curved second portion radially outward from an annular ridge formed on the first mould half, which curved second portion has a radius of curvature equal to or within plus or minus 200 μm of the front optical zone radius for a hydrated −3.00D lens;
   d) a ratio of a radius of a first mould half to the lens back optical zone radius of the hydrated lens is less than 1.2;
   e) the maximum internal height of the internal volume from an annular ridge formed on the female mould half to the intersection with the rim diameter is 6 mm or less;
   f) the vertical clearance between the lens sagittal height and the internal height of the internal volume from an annular ridge formed on the female mould half to the intersection with the rim diameter is 2.5 mm or less;
   g) the ratio of the maximum internal height of the internal volume from an annular ridge formed on the female mould half to the intersection with the rim diameter to the front sagittal height of a hydrated lens is 1.6 or less;
   h) the diameter of the rim is 18 mm or less; or
   i) the ratio of the diameter of the rim to the diameter of a hydrated lens is 1.4 or less.

* * * * *